Oct. 26, 1954  N. B. WATSON  2,692,526
MUSIC TEACHING DEVICE
Filed May 8, 1951  3 Sheets-Sheet 1
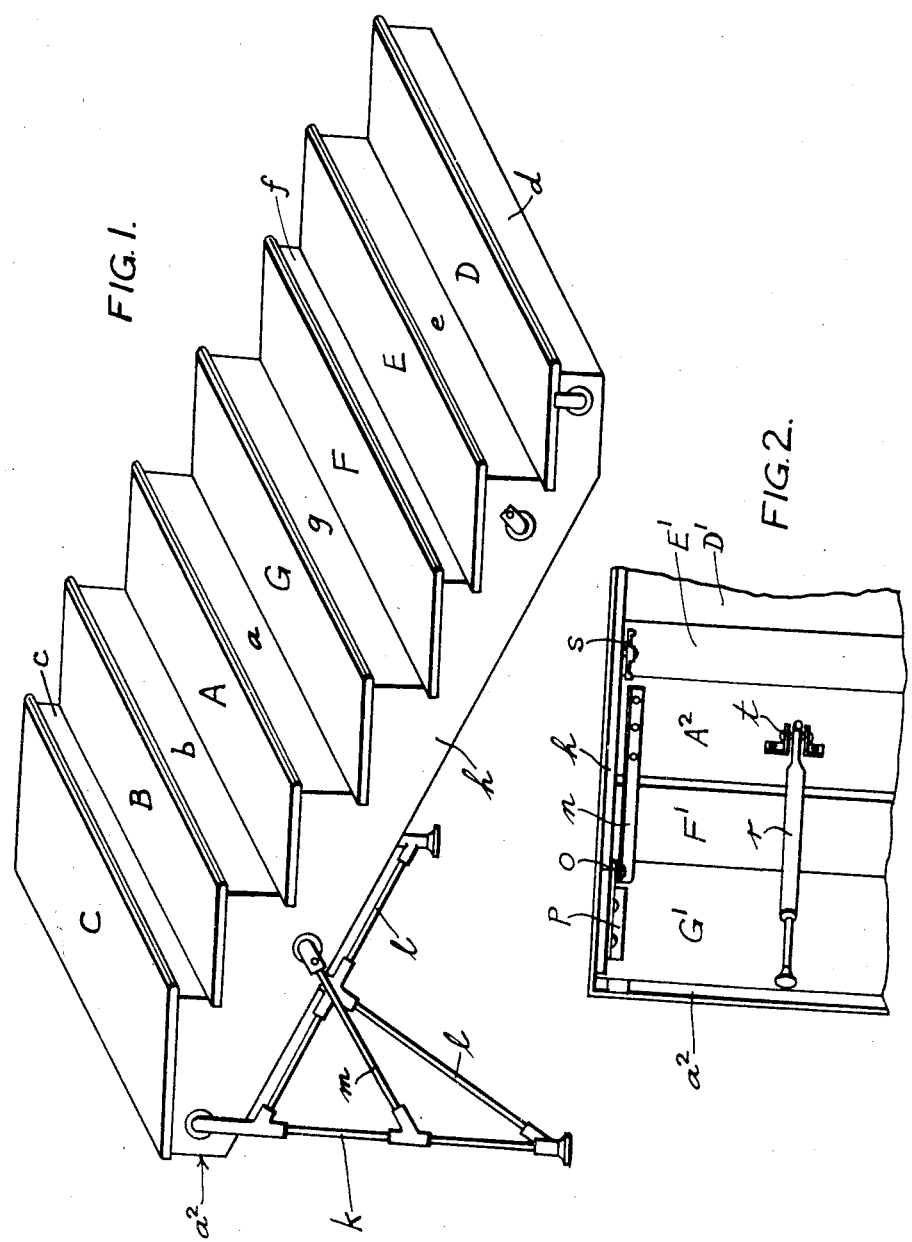
INVENTOR:
NORA BENNET WATSON
By Francis E Boyce
ATTORNEY

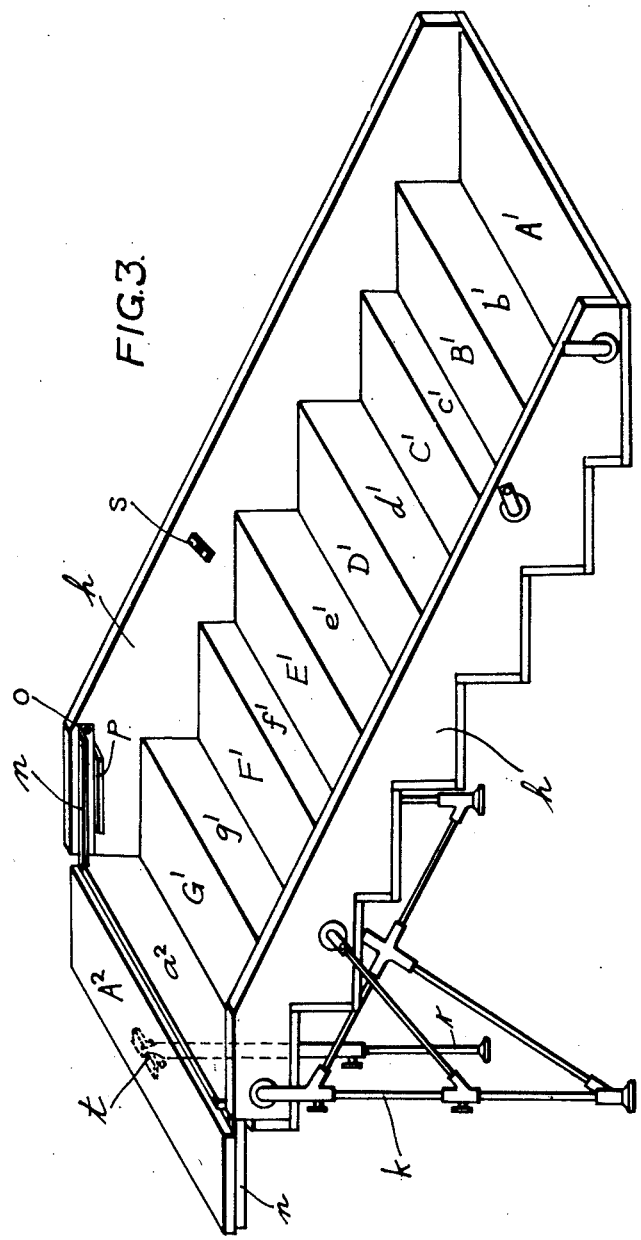

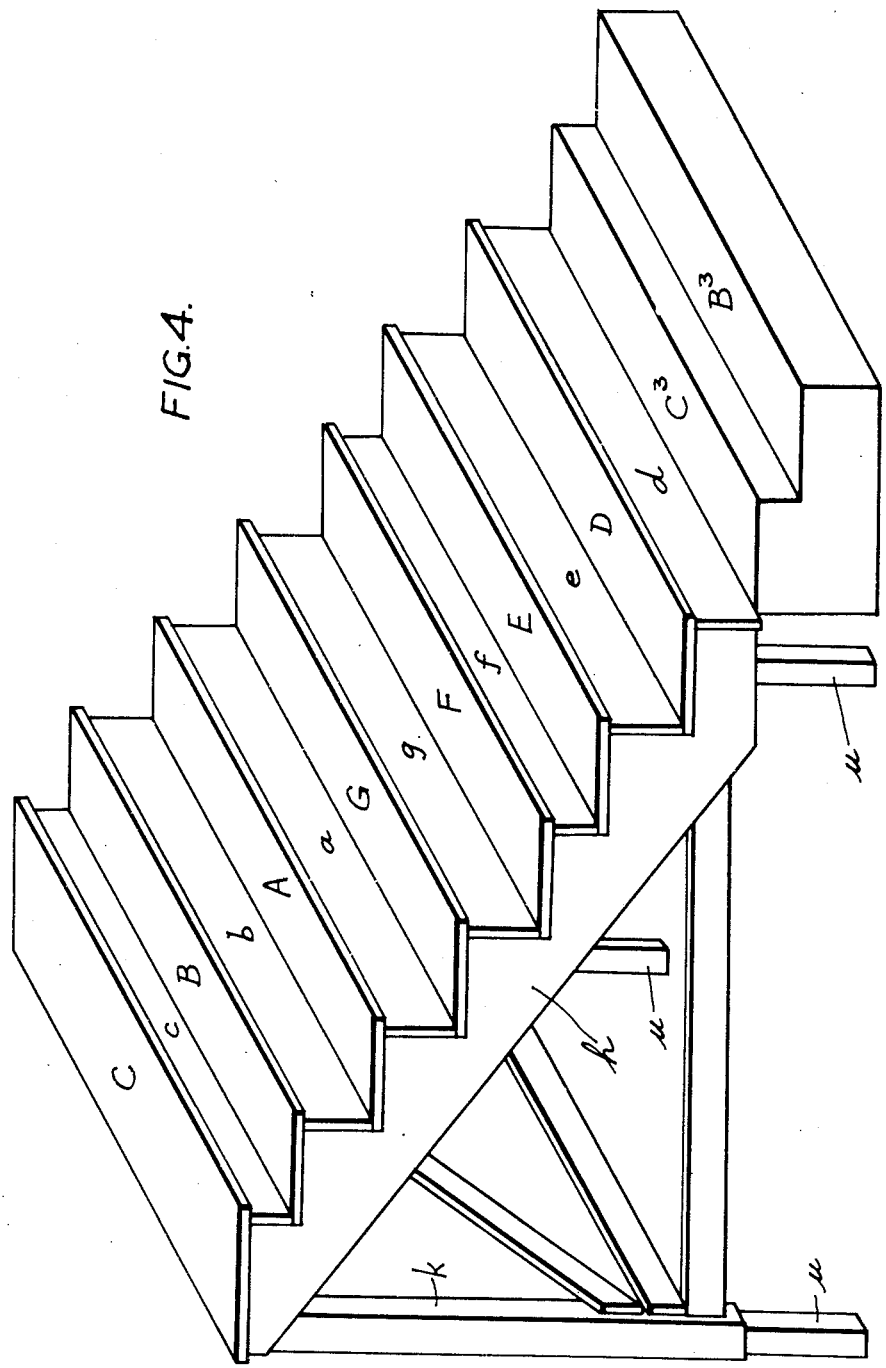

Patented Oct. 26, 1954

2,692,526

UNITED STATES PATENT OFFICE 2,692,526

MUSIC TEACHING DEVICE

Nora B. Watson, Edinburgh, Scotland

Application May 8, 1951, Serial No. 225,129

1 Claim. (Cl. 84—472)

This invention relates to music teaching devices and particularly to devices for illustrating musical pitch, and has for its object to provide a device for the above purpose which is particularly adapted for teaching young trainees and others who are not normally in possession of any musical knowledge except an inherent preception of musical tone and rhythm.

My invention broadly consists in a device comprising a series of steps, the tread of each step representing a note of a musical scale and the risers between the steps varying to represent the musical intervals between the notes of the scale.

For practical purposes, it is preferred to employ the device for illustrating the change of pitch of the notes forming the major scale.

Accordingly, my invention particularly consists in a step ladder with seven steps, the tread of each step representing a note of the major scale and the risers between successive steps representing in height the number of full tones and semi-tones of the scale. Thus, if the lowermost tread represents D of the scale, then the riser between the treads representing E and F, and the riser between the treads for B and high C will each be of a height half that of any one of the other risers of the ladder.

The device may be constructed of timber or any other suitable material and may have each tread or complete step covered with or formed of light metal or other material.

The steps may be mounted on a framework or support which is preferably of light construction so that the complete step ladder structure is portable or readily movable from one place to another. The step ladder may be in the form of a permanently rigid structure detachably secured to a framework or support. Alternatively, the steps and/or framework may be constructed to collapse or fold from a rigidly erected position to a collapsed or folded position, thus facilitating transportation of the step ladder.

According to a further feature of my invention, the series of steps is convertible to constitute a series of treads and risers corresponding to the minor musical scale. This may be effected by removably fitting two additional steps to the lower end of the series of steps representing the major scale and raising the series of steps so that the lower edge of the lowermost riser of the series of steps forms a riser between the upper tread of the two additional steps and the lowermost step of the series of steps. In this case the lower step of the two additional steps represents a full tone and the upper step represents a semi-tone of the minor scale. When the two additional steps are fitted in position, the two uppermost steps of the series of steps are covered or otherwise put out of use.

It is preferred however to provide a reversible step ladder structure having a series of steps arranged in the order of the minor scale on the underside of a series of steps arranged in the order of the major scale, so that either scale can be used by reversing the step ladder structure. In such case, the bottom of the series of steps representing the major scale is preferably provided with a collapsible or foldable additional step which, when extended or unfolded, forms the top step of the series representing the minor scale.

The invention will be more readily understood by reference to the accompanying drawings whereon:

Fig. 1 is a perspective view of a reversible music teaching device according to the preferred form of my invention, shown in position for use in teaching the major scale.

Fig. 2 is a fragmentary plan view of the lower end portion of the device shown in Fig. 1 inverted to show a concealed additional step.

Fig. 3 is a perspective view of the device reversed for use in teaching the minor scale with the additional step extended.

Fig. 4 is a perspective view of an alternative form of the device in which two additional steps are used when teaching the minor scale.

Referring firstly to Figs. 1 and 2, there is shown a step ladder structure consisting of treads D, E, F, G, A, B and C corresponding to the major scale, and risers $d$, $e$, $f$, $g$, $a$, $b$, $c$, whereof the risers $f$ and $c$ are half the height of the other risers. The series of steps is mounted on side members $h$ which rest at one end on the floor and are supported from the floor at the other end by a leg frame $k$ which may be stiffened by cross-bracing $l$ and is detachable from the side members $h$. A detachable strut $m$ may be provided to hold the leg frame $k$ rigidly in position.

The risers representing a change of pitch of one major or full tone, that is to say, the risers $d$, $e$, $g$, $a$ and $b$ may have a height of, say, four inches, and the risers representing a change of pitch of one semi-tone, that is to say, the risers $f$ and $c$ may have a height of, say, two inches. Thus, the overall height of the ladder may be in the region of twenty-four inches, and may be of any desired width. These sizes are given only by way of example.

When employing the device for instructional purposes, the ladder structure is placed anywhere in a room, but preferably adjacent a spot on the floor marked or otherwise indicated as corresponding to the key note C of the C major scale. One or more trainees then stand on this spot on the floor and face the step ladder. The instructor may then sound the key note C by means of, say, a pianoforte, tuning fork or pitch pipe and, if a pianoforte is used, preferably doubles the root of the C major common chord so that key note C is audible at both extremes of the chord. The instructor then sounds D whereupon the trainees react to the sound and place one foot on the first tread D of the ladder, and D is sounded again, quickly, as the trainees each place their other foot on the first tread D. The remaining notes of the scale are then sounded successively in a similar manner until the trainees have reached the top tread which corresponds to high C, whereupon middle C is sounded and the trainees either jump to or are lifted to the ground upon hearing this note or chord struck.

By repeating the above procedure as often as desired, the trainees gain a sense of the pitch formation of the scale, and will have the pitch of middle C gradually established in their musical senses.

It will be seen that, by simply observing the step ladder, the trainee will gain a visual impression, represented by the change in height of the risers, of the change in pitch between successive notes, and by mounting the flight of steps when reacting to a succession of musical notes of a scale, the trainee will experience a physical sensation of change corresponding to the change in pitch of the notes sounded.

Referring now to Figs. 2 and 3, the series of steps shown in Fig. 1 are constructed on their underside by the use of suitable filling pieces in such a manner that, by removing the leg frame $k$ and inverting the structure, there is provided a second series of steps between the side members $h$, this second series consisting of treads A', B', C', D', E', F' and G', with risers $b'$, $c'$, $d'$, $e'$, $f'$ and $g'$, whereof the risers $c'$ and $f'$ are half the height of the other risers. To complete the minor scale, an additional step $A^2$ with riser $a^2$ is provided. The step $A^2$ is carried by arms in the form of angle bars $n$ hinged at $o$ to angle bars $p$ which are secured to the side members $h$ and form supports for the arms $n$ when the step is extended as shown in Fig. 3 and supported from the ground by a leg $r$. When the device is not in use for the minor scale, the step $A^2$ is folded over about the hinges $o$ until it lies between the side members $h$ in which position it may be locked by locking elements $s$. The leg $r$ is also preferably made telescopic and hinged at $t$ to the underside of the step $A^2$ so that it can be accommodated under the steps when the structure is upturned into the position shown in Fig. 1.

With the device in the position shown in Fig. 3, the trainees first stand on the step A' (the underside of which rests on the ground), for receiving instruction in the minor scale in a manner similar to that already described for the major scale.

Fig. 4 illustrates a simpler form of my invention wherein the series of steps consists of treads D, E, F, G, A, B and C and risers $d$, $e$, $f$, $g$, $a$, $b$ and $c$ as in Fig. 1 secured to side members $h$ mounted on a leg frame $k$, which is shown as a rigid structure in Fig. 4, but which may be detachable as in Fig. 1. For use in teaching the major scale, the leg frame $k$ and the lower ends of the side members $h$ rest on the ground. In order to convert the device for use in teaching the minor scale, the leg frame $k$ is provided with telescopic or folding extension feet $u$ and the front end of the device is supported on similar telescopic or folding feet $u$ arranged to raise the step ladder sufficiently to enable an additional pair of steps $B^3$ and $C^3$ to be fitted in front of the step ladder as shown, the depth of the step $B^3$ being twice the depth of the step $C^3$ which is half the depth of step D.

Since the top steps B and C would not represent the true notes of a minor scale, they are not used when teaching the minor scale. They may be covered with a cloth or carpet, or they may be made removable or collapsible.

It will be apparent that various other modifications may be made within the scope of the invention hereinafter claimed.

I claim:

As a new article of educational furniture for teaching children musical scales, a connected flight of seven steps of which the lowermost step is adapted to rest on the ground and each step is of such size and breadth that at least one child can readily mount the steps, the third and seventh steps being half the height of each of the other steps, means for supporting the flight of steps in an inclined position in which the lowermost step rests on the ground and the treads of the steps are horizontal, a connected pair of additional steps of which the lower one is twice the height of the upper one which is of the same height as the third and seventh steps of the connected flight, and means for raising the connected flight until the bottom thereof is level with and positioned adjacent the tread of the upper of the pair of additional steps when the lower of said additional steps rests on the ground.

References Cited in the file of this patent

UNITED STATES PATENTS

| Number | Name | Date |
| --- | --- | --- |
| 619,294 | Fletcher | Feb. 14, 1899 |
| 675,723 | Forfar | June 4, 1901 |
| 821,391 | Wiltse | May 22, 1906 |
| 1,293,715 | Claycomb et al. | Feb. 11, 1919 |
| 1,600,052 | McAleavey | Sept. 14, 1926 |
| 1,796,845 | Jolls | Mar. 17, 1931 |
| 2,226,338 | Cobb | Dec. 24, 1940 |

FOREIGN PATENTS

| Number | Country | Date |
| --- | --- | --- |
| 136,414 | Switzerland | Jan. 2, 1930 |